United States Patent [19]

Troughton

[11] 3,716,906
[45] Feb. 20, 1973

[54] METHOD OF MAKING FOOD CONTAINERS
[75] Inventor: Thomas D. Troughton, Richmond, Calif.
[73] Assignee: Rheem Manufacturing Company, Richmond, Calif., New York, N.Y.
[22] Filed: April 6, 1970
[21] Appl. No.: 25,637

[52] U.S. Cl. ..................29/460, 228/31, 219/105, 219/59
[51] Int. Cl. ..............................B23k 11/00
[58] Field of Search..........29/460, 423, 460 XR, 470, 471.7, 29/498, 477, 486; 228/15, 16, 31, 30; 72/49; 53/266; 219/31, 30; 219/76, 59, 67, 104, 105; 113/120; 117/130

[56] References Cited

UNITED STATES PATENTS

| 2,208,732 | 7/1940 | Powell | 29/460 |
|---|---|---|---|
| 2,245,102 | 6/1941 | Field | 29/460 |
| 2,273,154 | 2/1942 | Stromsoe | 228/16 |
| 2,819,379 | 1/1958 | Wiley | 228/15 |
| 2,905,512 | 9/1959 | Anderson | 29/460 |
| 2,944,338 | 7/1960 | Craig | 29/460 |
| 3,333,754 | 8/1967 | Catalano | 228/15 |
| 2,535,836 | 12/1950 | Cameron et al. | 228/30 |
| 2,517,574 | 8/1950 | Jones et al. | 228/30 |
| 2,181,319 | 11/1939 | Flugge | 228/31 |
| 2,679,278 | 5/1954 | Clark | 29/477 |
| 2,135,532 | 11/1938 | Reid | 228/31 |
| 3,597,574 | 8/1971 | Erlandson | 219/105 |
| 3,523,513 | 8/1970 | Maier et al. | 219/59 |

Primary Examiner—Charles W. Lanham
Assistant Examiner—Daniel C. Crane
Attorney—Joseph B. Gardner

[57] ABSTRACT

A method of making tin lines drums and other large containers adapted for use in storing and shipping food products. The method is particularly concerned with making the shell or body tube for such container, and utilizes as the starting material a flat metal sheet plated along at least one side with a layer of tin. The plated sheet is formed into a tube having overlapped longitudinal edges which are then seam welded to each other from end to end thereof. Finally, the welded seam and surface portions bordering the same along the interior of the shell are sprayed with molten tin which is reflowed after impact with the shell because the temperature thereof along the sprayed band is maintained at a value above the melting temperature of the tin by utilizing for this purpose a component of the residual heat from the seam welding process.

13 Claims, 4 Drawing Figures

PATENTED FEB 20 1973　　　　　　　　　　3,716,906

INVENTOR:
THOMAS D. TROUGHTON
BY: Joseph B. Gardner
ATTORNEY

METHOD OF MAKING FOOD CONTAINERS

This invention relates to a method of making containers and, more particularly, to a method of making the shell or body tube of a large metal container intended for use in storing and shipping food products and the like.

Until recent years, metal containers of the type in which food products are shipped and sold have been of very limited volume with the number 10 can being about the largest container available for this purpose. In recent years, however, larger containers have come into use and the 55-gallon drum is an example thereof, it being the largest container presently used for shipping and storing food products. Such drums, and their smaller counterparts which are known as "pails," have the shells or body tubes thereof (which are usually but not necessarily cylindrical in cross section) formed from flat steel sheets bent into a cylindrical configuration with the longitudinal edge portions thereof overlapped and welded together, thereby constraining each metal sheet in its tubular form and establishing a seal along the side seam defined by the overlapping edge portions. Thereafter, the interior of the shell is plated with a layer of tin to enable the shell to withstand attack thereon by the organic acids of the food products packaged within the completed container.

Respecting the requirement for tin plating, it has long been known that food products attack the containers in which they are stored, and as concerns metal and particularly steel containers the attack thereon is attributable to a large measure to the organic acids in the food products. The acidic attack on the metal consumes the same and causes hydrogen gas to be evolved in the process, thereby elevating the pressure within the container until the combination of the increased pressure and weakened surface areas of the container cause the latter to puncture or spring a leak at the weakest location. Once leakage occurs, the container and its contents are destroyed.

In order to reduce the rate of attack of the food acids on the steel containers, it is conventional practice to plate at least the inner surfaces of each container with a coating or layer of tin which serves as a sacrificial cathode protecting the steel container from direct attack until the tin has been consumed. The tin-plated inner surface of the food container provides a rather complex protective mechanism that involves barrier layers respectively formed along the union of the tin and steel surfaces and along the outer surface of the tin (the outer barrier layer is often supplemented by coating the tin with a synthetic plastic material such as one of the oreoresinous materials used for this purpose), and a free tin layer located between the two barrier layers. A grading system is used to rate the quality of the tin plating in a food container so as to predict the storage life thereof, and such system takes into account the presence or absence of the barrier layers and the amount of free tin available for dissipation. It may be noted that the extent to which free tin is available for sacrifice to the organic acids determines what, if any, barrier layers are necessary.

As previously stated, all of the pail- and drum-size containers used for storage and shipment of food products have heretofore had the shell or body tube thereof provided with the requisite coating of tin along their inner surfaces after being shaped and welded. The reason therefor is that no practicable procedure has been known to protect only the welded seam of a container shell with a coating of tin after formation thereof which is necessary because either welding destroys any prior tin plating along the overlapped edges or the tin along such edges is removed preparatory to welding the same, depending upon the type of welding equipment used. Although the large food containers manufactured by first forming and welding the overlapped edge portions of a steel sheet to construct the body tube and then plating the entire inner surface thereof with the necessary layer of tin are very satisfactory from the point of view of use, they are nevertheless quite costly to make because it is difficult and expensive to coat the inner surface of the body tube or shell after it has been formed.

Accordingly, it is an object of the present invention to provide an improved method of making relatively large metal containers for food products, and which containers have the shells or body tubes thereof formed from flat steel sheets that have previously been coated or plated along at least one side thereof with a layer of tin.

Another object of the invention is that of providing an improved method of making the shells or body tubes of large containers for food products, such as 55-gallon drums and pails of various capacities intermediate the number 10 can and 55-gallon drum, and which method includes replacing the tin coating destroyed or reduced in effectiveness by the welding process, or preparatory thereto, which sealingly joins the overlapped edge portions of each sheet.

Still another object is in the provision of an improved method of the type described which utilizes a portion of the residual heat conducted by the metal sheet from the restricted vicinity of the weld therealong throughout a band of substantial width generally overlying and bordering the welded seam to deposit a layer of tin therealong replacing the tin coating destroyed or damaged by the intense localized heat developed during the seam welding process.

A further object of the invention is to provide a method of the character explained in which the supplemental or added tin layer is reflowed following deposition thereof along the inner surface of the welded overlapped portions of the shell by utilizing, at least in part, the residual heat radiating outwardly from the localized area of the seam weld joining such two edge portions of the shell.

Yet a further object is that of providing a method in which a coating of tin is applied to the inner surface of the welded shell or body tube along a band somewhat wider in transverse extent than the weld seam by means of a flame spraying process in which molten tin is sprayed onto the heated surface defining such band, the residual heat from the welding process being used to reflow the spray-deposited tin so as to integrate the same with the original tin coating and, at the same time, reduce somewhat the porosity of the spray-deposited layer so as to retard the rate at which it is sacrificed to the organic acids in the food product stored within the finished container.

Additional objects and advantages of the invention, especially as concerns particular features and characteristics thereof, will become apparent as the specification continues.

An embodiment of the invention is illustrated in the accompanying drawing, in which.

Figure 2:
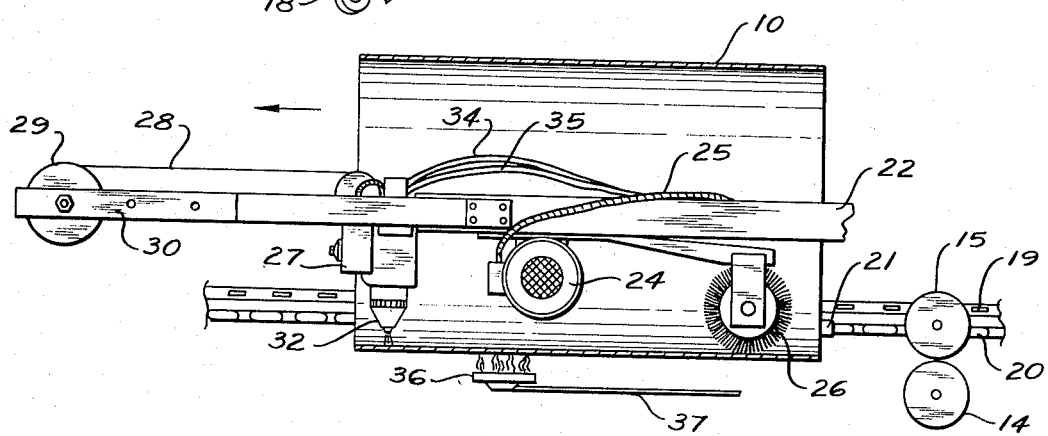
FIG. 2 is a broken longitudinal sectional view taken through the shell and illustrating the various stations along the conveyor at which the steps are performed of the method of forming a complete shell or body tube.
Figures 3, 4:
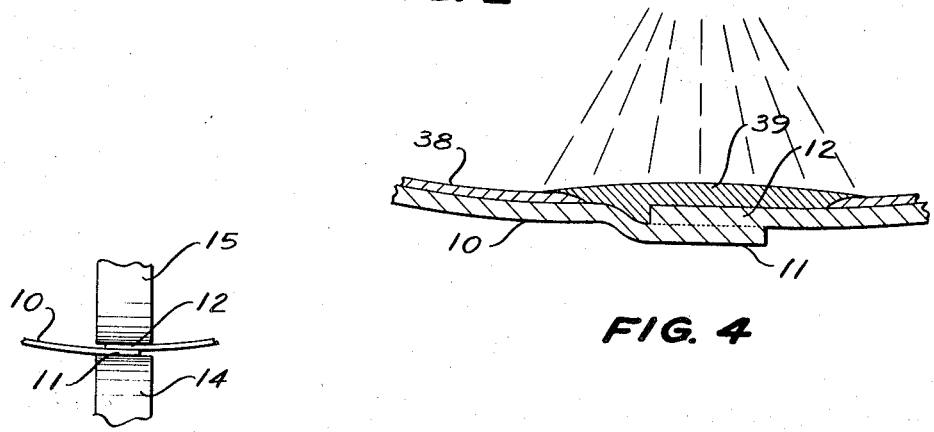
FIG. 3 is an enlarged, broken vertical sectional view illustrating the rotatable welding electrodes in contact with the overlapped edge portions of the body tube.
FIG. 4 is a further enlarged transverse sectional view illustrating the welded edge portions of the body cylinder with the auxiliary layer of tin being deposited therealong.

Prior to initiating discussion of the particular steps involved in the inventively improved method of making shells or body tubes for relatively large containers, it may be observed that such body tubes are generally old in a structural sense because they have been formed heretofore in an entirely different manner. Similarly, much of the apparatus used in fabrication of the body tubes in compliance with the present invention is also old and well-known in the art, and for this reason, the details of such apparatus will not be included herein. In the drawing, the shell or body tube is denoted generally with the numeral 10, and it has overlapping longitudinal edge portions 11 and 12 which are integrated or fused, as shown in FIG. 4, by a thermal welding process which, for purposes hereof, may be essentially conventional. In FIGS. 2 and 3, standard rotatable welding electrodes 14 and 15 are shown which rollingly engage the respective edge portions 11 and 12 and effect fusion thereof. The welding process practiced is a seam welding technique in which the electrical resistance of the edges 11 and 12 is used to generate the temperature required to fuse the edges upon application thereto of the restricted compressive force developed thereagainst by the electrodes 14 and 15. Thus, no material is added to the edges 11 and 12 to affect joinder thereof, and the end result is a continuous seam therealong formed by utilizing conventional resistance welding techniques.

The particular metal thickness used for form the body tube 10 will depend to a considerable extent upon the size or capacity of the container. By way of example, the body tube for a 55-gallon drum used to ship and store food products may be 18 gage commercial quality cold rolled steel, the thickness of which at the midpoint of the gage range is 0.047 inch. A smaller container such as a 10-gallon pail may be formed of 26 gage commercial quality cold rolled steel which has a midpoint gage range of 0.0175 inch. Alternatively, such 10-gallon pail might be formed from 135-pound basis box tin coated black plate steel having a thickness of about 0.0152 inch and being covered with a one-half pound coating of tin on each side thereof over the basis box area (i.e., 31,360 square inches).

Figure 1:
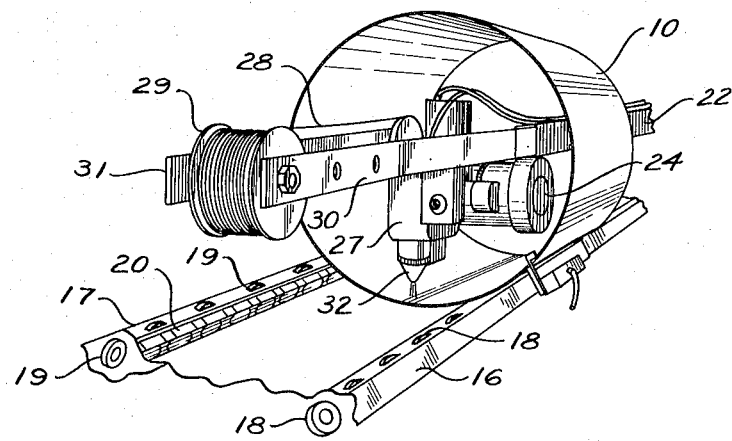
FIG. 1 is a broken perspective view of the shell or body tube of a 55-gallon drum being advanced along a conveyor and through the station at which a supplemental or auxiliary coating of tin is applied to the welded edge portions of the shell.

It should be understood that in all cases, the sheet steel will be plated at least along one side thereof (i.e., the inside of the body tube) prior to formation of the body tube by shaping the same into the generally cylindrical form shown in FIG. 1, and then welding the overlapped edge portions of the tube to each other. By way of example, the edges 11 and 12 may be overlapped by about one-eighth of an inch, and the body tubes in a typical fabrication line are advanced between the welding electrodes 14 and 15 at a rate of about 35 to 40 feet per minute. The high value current passed through the overlapping edge portion 11 and 12 by the electrodes 14 and 15 elevates the temperature of the edge portions to the order of 2,400°F. which fuses or thermo welds such edge portions to each other.

The conveyor apparatus used to advance the body tubes 10 through the various fabrication stations is conventional, and it includes transversely spaced side rails 16 and 17 respectively equipped at longitudinally spaced locations therealong with lugs or dogs 21 adapted to engage the trailing edge of the cylinder 17 and propel it forwardly in the direction of the arrow shown in FIG. 2 as it is supported upon the rollers 18 and 19. As stated hereinbefore, the conveyor apparatus is old and well-known in the art, and no further description thereof need be included.

Disposed along the conveyor in spaced relation thereabove is a boom 22 supported in a cantilever fashion at the rear end thereof, not shown. The boom 22 is oriented so as to pass through the body tube 10, as shown in FIGS. 1 and 2, as the tube is advanced along the conveyor. Evidently, the support for the boom 22 must be located at a position along the conveyor prior to the position at which each flat metal sheet used for form a body tube 10 is rolled into the cylindrical configuration defining the same. Again, a boom 22 of the type shown is old and well-known in association with a drum conveyor, and further details thereof will not be provided. It is adequate to state that the boom 22 has for its function the support of the various pieces of equipment needed to perform operational procedures within the interior of the body 10 as it is advanced by the conveyor. In the particular method being considered, the boom 22 projects forwardly or down stream from the welding station, and the equipment necessary to perform the subsequent steps in the tube-forming method is supported by the boom.

More particularly, the boom 22 supports therealong an electric motor 24 that receives energizing power via electric conductors mounted within a cable 25 extending along the boom 22 to the base or supported end thereof. The motor 24 is used to rotatably drive an abrading or scaling device 26 that is also supported by the boom 22 and may be any one of a number of abrasive mechanism as, for example, a wire brush as shown. The brush or abrading device 26 is operative to remove loose scale and similar matter formed along the inner seam surface of the body 10 as a consequence of the welding operation in which the edge portions 11 and 12 thereof are fused.

Also supported along the boom 22 down stream of the brush 26 is a tin deposition mechanism generally denoted with the numeral 27. The mechanism 27 in the form shown is a flame spraying apparatus in which tin previously drawn into a wire 28 is supplied from a reel 29 rotatable supported between spaced apart brackets 30 and 31 forming a part of the boom 22. The tin wire 28 is advanced at a controlled rate into the flame spraying device 27 upon demand whereat a combustion flame melts the tin and a compressed air blast atomizes the molten metal and projects it through a nozzle 32 onto the inner surface of the body 10 generally along the edge portion 12, as shown in FIG. 4. The combustion gases, compressed air, and other supply requirements of the device 27 (other than the tin wire) are carried thereto via a plurality of conductors 34 and 35 which extend along the boom 22 to the supported end thereof. As respects the present invention, the flame spraying device 27 may be conventional and, for example, may be one of the standard flame spraying machines for a wire metalizing process such as the type 3K Heavy Duty Metalizing Machine sold by Metco Inc. of Westbury, Long Island, New York.

Although it is not necessary that the surface to be metalized be heated before atomized metal is deposited thereon from the nozzle 32, as will be explained hereinafter, it is desired to reflow the deposited metal and residual heat from the seam welding process is utilized in effecting such reflow of the atomized tin. In certain instances it is desirable to supplement the residual heat, and this is especially true in the case of containers being formed of thinner gage metal which disipates the heat quite rapidly by conduction through the body tube 10 from the immediate site of the seam weld at the overlapping edges 11 and 12. A typical means of supplying supplemental heat to the body 10 is shown in FIG. 2, and it includes an open-flame burner 36 located between the transversely spaced rails 16 and 17 of the conveyor at a position intermediate the welding electrodes 14, 15 and the spraying device 27. The burner 36 in the form shown is intended to have a suitable hydrocarbon fuel delivered thereto through a supply line 37 which will be equipped with the usual control valve to permit the flow of fuel to the burner to be regulated.

In certain instances it is advantageous to prepare the edge portions 11 and 12 for the seam welding operation, but this depends to a great extent upon the type of welding equipment used. Preparation consists essentially of cleaning the surfaces of the overlapped edge portions 11 and 12 as by abrading the same with an abrasive wheel, belt, or other abrasive grinder, or by shot blasting techniques which has a peening effect on the metal—the latter being prefered because it does not gouge or scratch the metal which can weaken the same. Exemplary edge preparation equipment is not shown because it precedes the welding electrodes 14 and 15, it is conventional in function and structure, and has been used heretofore in standard drum- and pail-forming lines.

In forming the body 10, the flat sheet of steel previously cut into a rectangular configuration is rolled into the tubular form illustrated with the longitudinal edges thereof overlapped, as shown at 11 and 12 in both FIGS. 3 and 4. The rolled sheet is then displaced along the conveyor because of the engagement of a lug 21 carried by the endless chain 20 with the trailing edge of the tube, and the overlapped edges 11 and 12 are advanced between the rotatable electrodes 14 and 15 which pass an electric current of sufficient magnitude through such overlapped edges to seam weld the same. As previously stated, forming and welding the overlapped edges of a flat sheet in the manner explained are old except that heretofore, the starting sheet was not plated with a tin coating along one side thereof, as with the coating 38 illustrated in FIG. 4.

Subsequent to the welding operation, the body tube 10 is advanced through the scaling station defined by the brush 26 which engages the inner surface of the drum along the welded edges thereof to remove slag and scale therefrom. The body tube 10 also passes through the heating station in heat exchange relation with the burner 36 so that supplemental heat is delivered to the surface of the tube along the same formed by the edges 11 and 12, although the band of heat supplied by the burner 36 will be somewhat greater in transverse dimension and may encompass a transverse width of about 1 inch, for example (in certain cases in which the overlap is about one-eighth of an inch, the spray band may have an overall width of about one-fourth of an inch in which event the width of the heated area need be only about one-fourth of an inch).

The width of the heat band and the amount of heat delivered by the burner 36 (other forms of heat delivery to the drum may be used, of course) will depend upon several variable parameters including, for example, the rate in which the tube 10 is advanced by the conveyor, the distance between the welding electrodes 14, 15 and the spray device 27, and the gage of the metal forming the body 10. In this respect, tin has a melting temperature of approximately 450°F., and it is desired to have the temperature of the tube 10 along the band receiving tin spray from the nozzle 32 at a temperature sufficiently high to melt the spray deposited along the surface of the drum so as to reflow the spray-deposited layer of tin. It has been found, however, that it is best to keep the temperature of the shell 10 below about 500°F. because temperatures much in excess thereof tend to oxidize the tin coating.

If the tube 10 is being advanced quite slowly and if the spray device 27 is spaced by a considerable distance from the welding station, it may be necessary to add considerable heat to the tube in order to provide a band containing sufficient heat to reflow the tin deposited thereonto from the nozzle 32. Similarly, heat will disipate much more rapidly from the welding situs through thin metal than through thicker steel stock, so that if the various parameters have been adjusted in a manner requiring no supplemental heat for metal of a particular thickness (18 gage for example), supplemental heat may be necessary for a thinner metal (26 gage for example) assuming that the other parameters remain the same. Correspondingly, it may not be necessary to scale the welded surface area of the body 10 prior to deposition of atomized tin thereon in certain cases, so that the brush 10 need not be actuated in those situations.

The layer of tin sprayed onto the tube 10 through the nozzle 32 has a somewhat greater thickness than that of the tin coating 38 originally covering the inner surface of the tube, but the difference in thickness is only a few thousandths of an inch. This difference in thickness has been somewhat exaggerated in FIG. 4 for illustrative purposes to make it quite evident by visual comparison of the original coating 38 with that of the spray-deposited coating 39. By way of example, the thickness of the tin plate 38 may be about 0.015 inch and the coating 39 may be slightly thicker, say about 0.017 inch. The reason for increasing the thickness of the tin coating 39 slightly is to provide an additional quantity of available free tin for protection of the steel in the general vicinity of the weld since an inner barrier layer otherwise present along the contiguous surfaces of the steel sheet and tin plating 38 thereon is not present, at least to the same extent, along the contiguous surfaces of the steel sheet and spray-deposited layer. Availability of an excessive quantity of free tin is a precautionary feature, and the amount of tin deposited by the nozzle 32 is readily determined by adjusting the rate at which the tin wire 28 is delivered to the device 27 upon demand therefrom and by adjusting the atomizing pressure.

Since the temperature of the body 10 along a longitudinally extending band somewhat wider in transverse extent that the overlapped edge portions 11 and 12 is above the melting temperature of tin, the tin globules sprayed against such surface from the nozzle 32 either remain molten or are melted subsequent to contact, but in either case they reflow and merge with the adjacent edges of the tin coating 38 so that a substantially indistinquishable surface is presented by the two tin masses 38 and 39 along the interior of the tube 10 to any food products subsequently packaged within the finished container comprising the same.

Thereafter, the shell or body tube 10 is used in the same manner as a tube formed in accordance with the prior practice in which the interior thereof is plated with a layer of tin after its formation. Accordingly, the inner surface of the tube 10 may or may not be covered with a plastic film to provide a further barrier layer isolating the food product from the steel shell, and the body is equipped with end closures which are sealingly secured thereto by the conventional techniques heretofore employed.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a method of making a body tube for a relatively large metal container adapted to receive and store food products and the like therein from a metal sheet plated along one side thereof with a coating of tin, the steps after formation of such a sheet into a tubular configuration with the longitudinal edge portions thereof overlapping and elevating the temperature of such edge portions to a value exceeding the melting temperature of tin and sufficient to weld the edge portions and thereby constrain the sheet in tubular form with the tin coating thereon oriented along the inner surface thereof, and, within the time interval subsequent to said temperature elevation and prior to substantial temperature reduction thereafter by dissipation of the heat attributable thereto, depositing molten tin onto the inner surface of said tube along a longitudinally extending band having a transverse width embodying said weld and corresponding generally to the width of the area elevated at least in part to the reflow temperature of the molten tin by the welding heat dissipating transversely through said tube from the site of the weld therealong.

2. In a method of making the body tube for a relatively large metal container adapted to receive and store food products and the like therein from a metal sheet plated along one side thereof with a coating of tin, the steps after formation of such a sheet into a tubular configuration with the longitudinal edge portions thereof overlapping and elevating the temperature of such edge portions to a value sufficient to weld the same and thereby constrain the sheet in tubular form with the tin coating thereon oriented along in inner surface thereof, heating tin to the melting temperature thereof, and, within the time interval subsequent to said temperature elevation and prior to substantial temperature reduction thereafter by dissipation of the heat attributable thereto, spraying the molten tin onto the inner surface of said tube along a longitudinally extending band having a transverse width embodying said weld and corresponding generally to the width of the area elevated at least in part to the reflow temperature of the tin by the welding heat dissipating transversely through said tube from the site of the weld therealong.

3. The method of claim 2 in which the step of spraying molten tin onto the inner surface of said tube is continued until the layer of sprayed tin is somewhat greater in thickness than the original coating of tin along the inner surface of the tube.

4. The method of claim 2 in which the step of elevating the temperature of said overlapping edge portions is effected by resistance welding the same, and in which the step of spraying molten tin onto the inner surface of said tube closely follows the welding step so as to minimize escape of heat from said tube to the ambient environment in which it resides.

5. The method of claim 4 in which said welding and spraying steps are respectively effected at spaced stations, and in which said tube is continuously moved through said stations.

6. The method of claim 5 in which the step of spraying molten tin onto the inner surface of said tube is continued until the layer of sprayed tin is somewhat greater in thickness than the original coating of tin along the inner surface of the tube.

7. In a method of making the body tube for a relatively large metal container adapted to receive and store food products and the like therein from a metal sheet plated along one side thereof with a coating of tin, the steps after formation of such a sheet into a tubular configuration with the longitudinal edge portions thereof overlapping and elevating the temperature of such edge portions to a value sufficient to weld the same and thereby constrain the sheet in tubular form with the tin coating thereon oriented along the inner surface thereof, spraying molten tin onto the inner surface of said tube along a longitudinally extending band having a transverse width embodying said weld and corresponding generally to the width of the area elevated at least in part to the reflow temperature of the molten tin by the welding heat dissipating transversely through said tube from the site of the weld therealong, and adding supplemental heat to said tube along the longitudinally extending band thereof subsequent to welding said overlapping edge portions and prior to spraying molten tin along said band.

8. The method of claim 7 in which the step of elevating the temperature of said overlapping edge portions is effected by resistance welding the same, in which the step of depositing tin onto the inner surface of said tube closely follows the welding step so as to minimize escape of heat from said tube to the ambient environment in which it resides, in which said welding and depositing steps are respectively effected at spaced stations, and in which said tube is continuously moved through said stations.

9. In a method of making the body tube for a relatively large metal container adapted to receive and store food products and the like therein from a metal sheet plated along one side thereof with a coating of tin, the steps after formation of such a sheet into a tubular configuration with the longitudinal edge portions thereof overlapping and elevating the temperature of such edge portions to a value sufficient to weld the same and thereby constrain the sheet in tubular form with the tin coating thereon oriented along the inner surface thereof, spraying molten tin onto the inner surface of said tube along a longitudinally extending band having a transverse width embodying said weld and corresponding generally to the width of the area elevated at least in part to the reflow temperature of the molten tin by the welding heat dissipating transversely through said tube from the site of the weld therealong, and scaling the inner surface of said tube along said longitudinally extending band subsequent to welding said longitudinal edge portions and prior to spraying molten tin along the longitudinally extending band.

10. The method of claim 9 in which the step of elevating the temperature of said overlapping edge portions is effected by resistance welding the same, in which the step of depositing tin onto the inner surface of said tube closely follows the welding step so as to minimize escape of heat from said tube to the ambient environment in which it resides, in which said welding and depositing steps are respectively effected at spaced stations, and in which said tube is continuously moved through said stations.

11. The method of claim 9 in which the further step includes adding supplemental heat to said tube along the longitudinally extending band thereof subsequent to welding said overlapping edge portions and prior to depositing tin along said band.

12. The method of claim 11 in which the step of elevating the temperature of said overlapping edge portions is effected by resistance welding the same, in which the step of depositing tin onto the inner surface of said tube closely follows the welding step so as to minimize escape of heat from said tube to the ambient environment in which it resides, in which said welding and depositing steps are respectively effected at spaced stations, and in which said tube is continuously moved through said stations.

13. The method of claim 12 in which the step of depositing tin onto the inner surface of said tube is continued until the layer of tin is somewhat greater in thickness than the original coating of tin along the inner surface of the tube.

* * * * *

UNITED STATES PATENT OFFICE
CERTIFICATE OF CORRECTION

Patent No. 3,716,906    Dated February 20, 1973

Inventor(s) Thomas D. Troughton

It is certified that error appears in the above-identified patent and that said Letters Patent are hereby corrected as shown below:

In the Claims,

Column 8, line 56, delete "and" and substitute --of--.

Column 10, line 12, delete "the" and substitute --a--.

Signed and sealed this 19th day of November 1974.

(SEAL)
Attest:

McCOY M. GIBSON JR.
Attesting Officer

C. MARSHALL DANN
Commissioner of Patents